US012527724B2

(12) United States Patent
Zhumanov

(10) Patent No.: US 12,527,724 B2
(45) Date of Patent: Jan. 20, 2026

(54) PORTABLE CONTAINER FOR A DISPOSABLE CUP

(71) Applicant: Talgat Kozhahanovich Zhumanov, Nur-Sultan (KZ)

(72) Inventor: Talgat Kozhahanovich Zhumanov, Nur-Sultan (KZ)

( * ) Notice: Subject to any disclaimer, the term of this patent is extended or adjusted under 35 U.S.C. 154(b) by 111 days.

(21) Appl. No.: 18/563,885

(22) PCT Filed: Jul. 14, 2022

(86) PCT No.: PCT/KZ2022/000007
§ 371 (c)(1),
(2) Date: Nov. 23, 2023

(87) PCT Pub. No.: WO2022/265483
PCT Pub. Date: Dec. 22, 2022

(65) Prior Publication Data
US 2024/0366478 A1 Nov. 7, 2024

(30) Foreign Application Priority Data
Jun. 17, 2021 (EA) .................................. 202191725

(51) Int. Cl.
*A61J 19/00* (2006.01)

(52) U.S. Cl.
CPC .................................... *A61J 19/00* (2013.01)

(58) Field of Classification Search
CPC ........................................................ A61J 19/00
USPC ..................... 4/258–261, 267–271, 274, 285
See application file for complete search history.

(56) References Cited

U.S. PATENT DOCUMENTS

| | | | | |
|---|---|---|---|---|
| 1,406,472 A * | 2/1922 | Mintzies | A61J 19/00 4/258 |
| 3,798,682 A * | 3/1974 | Harreld | A61J 19/00 4/258 |
| 4,162,547 A | 7/1979 | Jenkins | |
| 6,305,033 B1 * | 10/2001 | Azzam | A61J 19/00 4/258 |
| 8,929,057 B2 | 1/2015 | Rauta et al. | |
| 2016/0184187 A1 | 6/2016 | Brown | |

FOREIGN PATENT DOCUMENTS

| | | |
|---|---|---|
| KZ | 34062 B | 12/2019 |
| SU | 12958 | 1/1930 |
| SU | 47054 | 10/1935 |

* cited by examiner

*Primary Examiner* — Tuan N Nguyen

(57) ABSTRACT

The invention relates to portable devices for collecting small items of waste. A portable container is used, into which a disposable vessel, such as a cup, can be inserted and secured. The container consists of a rigid housing having upper and lower flip lids with seals. The upper lid further has a funnel opening, and the inside part of the container housing has a conical shape, the diameter of the lower inside part of the container housing being smaller than the diameter of the upper inside part, and also smaller than the diameter of the base of a disposable cup. The bottom of the lower part of the container housing has a hole, and the lower lid tightly closes the hole in the bottom of the container housing. The device makes it possible to collect small items of waste in a sealingly closable replaceable disposable vessel, while protecting same against deformation and damage.

4 Claims, 10 Drawing Sheets

PORTABLE CONTAINER FOR A DISPOSABLE CUP

The invention is aimed at solving a problem where a person needs to spit out or throw small items of waste such as gum, candy, seed husks, etc. while travelling by car, on a bus, in a train car, or when being confined to a wheelchair, hospital bed, or in other similar situation.

A hygienic cup is known which uses a hermetic lid and a rotatable partition, where an electrically heated spiral is located under the bottom thereof for the purpose of drying and burning spits. (Patent SU 47054, class 30f, 10, published on 19 Oct. 1935)

The disadvantage of this analogue is the use of electricity, which complicates the design and creates inconvenience in use.

The closest analogue of the invention is a container for collecting spits consisting of a receptacle in which disposable cardboard paper parts are inserted, where the receptacle, for inserting a cardboard part therein, is made without a bottom and is provided in its lower part with a notch for a rim with a lid hinged thereon, the lid being closed by means of a rod. (Patent SU 12958, class 30g, 14, published on 31 Jan. 1930)

The disadvantage of this analogue is that the neck of the receptacle is narrow, which is inconvenient when spitting. Further, the cardboard disposable spittoons inserted into the permanent receptacle may have only one size, creating complexity and inconvenience in use. This spittoon is a pocket spittoon, the volume of the spittoon is limited due to the size of the permanent receptacle and the size of the cardboard spittoon.

The purpose of the invention is to provide a small portable container having a rigid housing with sealingly closing lids, into which a replaceable disposable vessel in the form of a cup is placed, which will be protected from deformation and damage. After saliva, spits and items of waste enter the disposable cup, the container prevents the contents of the cup from flowing out and falling out.

The technical result of the invention as claimed is a portable container for a disposable cup for collecting saliva, spits and items of waste, having a rigid housing with sealingly closing lids, the inside part of the container housing has a conical shape and receives a replaceable disposable vessel in the form of a cup of different sizes, which will be protected from deformation and damage.

This is achieved by the fact that the inside part of the container housing has a conical shape, the upper part is wider than the lower part. Thanks to such a design, a larger disposable cup is fixed tightly in the upper part of the container housing, and a cup having a smaller diameter size is accordingly tightly fixed in the narrowing part of the container housing, in which the cone shape diameter of the inside part of the container housing has a slightly smaller diameter size of the upper part of the disposable cup. In order to make the portable container as versatile as possible for the maximum number of types of disposable cup size, and at the same time to minimize the height of the container housing, a recess having a conical shape is provided in the lowest part of the container, the narrow part of the recess being directed towards the bottom of the container housing. Thus, the bottom of the small disposable cup is fixed in the lower part of the conical shape of the container housing, and the disposable cup is positioned exactly in the center inside the container housing. The portable container for a disposable cup for collecting saliva, spits and small items of waste consists of a rigid housing (1) that is inserted with a disposable vessel in the form of a cup (2), a lower lid (3), an upper lid (4), a flip lid (5). The upper lid has a funnel opening (7) and a liner (8). The flip lid has a seal (9). The upper lid has a hole for a strap (10). At the bottom of the container housing (1), a hole is provided so that the disposable cup can be pushed out of the container with the fingers of the hand when it is replaced after use. The hole in the lower part of the container housing is tightly closed with the lower lid (3). The flip lid may also be provided with a spring (6). A holder with a magnet (11) can be fixed on the side part of the container housing. The portable container for a disposable cup for collecting saliva, spits and items of waste may additionally be provided with an expanding elastic rim (12) (see FIG. 7), which is inserted inside the housing (1) under the disposable cup (2) of small diameter. The expanding rim, thanks to its expanding ability, is tightly fixed inside the container housing at the required height. Thus, in this place, the diameter of the inside part of the container housing is reduced by the thickness of the expanding rim diameter, thereby fixing the disposable cup of smaller diameter in the upper part of the container housing, where it will be as close as possible to the funnel opening (7). (See FIG. 7 and FIG. 8).

Figure 1:
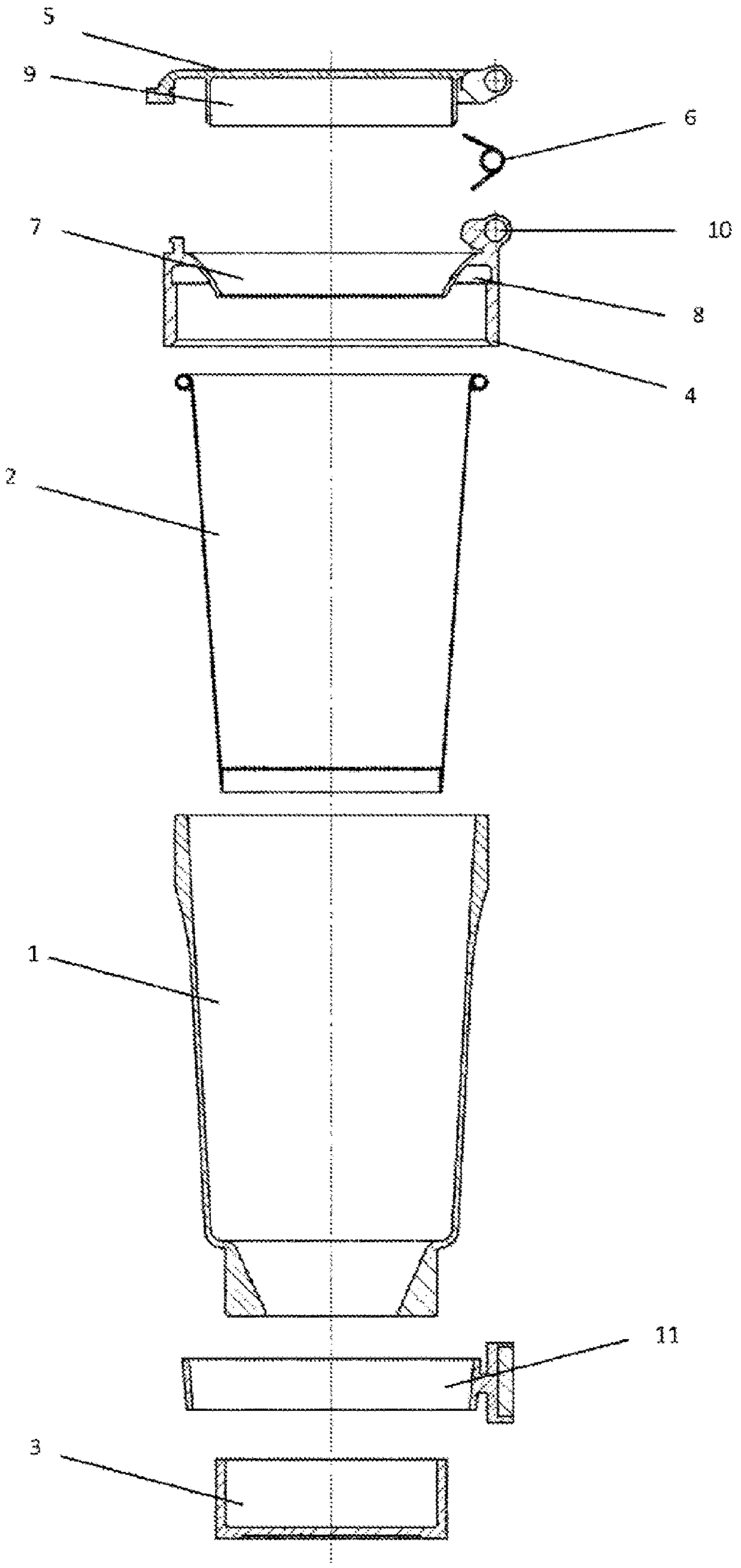
FIG. 1 shows an illustrative exploded view of the claimed container, with all parts labelled, for a disposable cup of large size.
Figure 2:
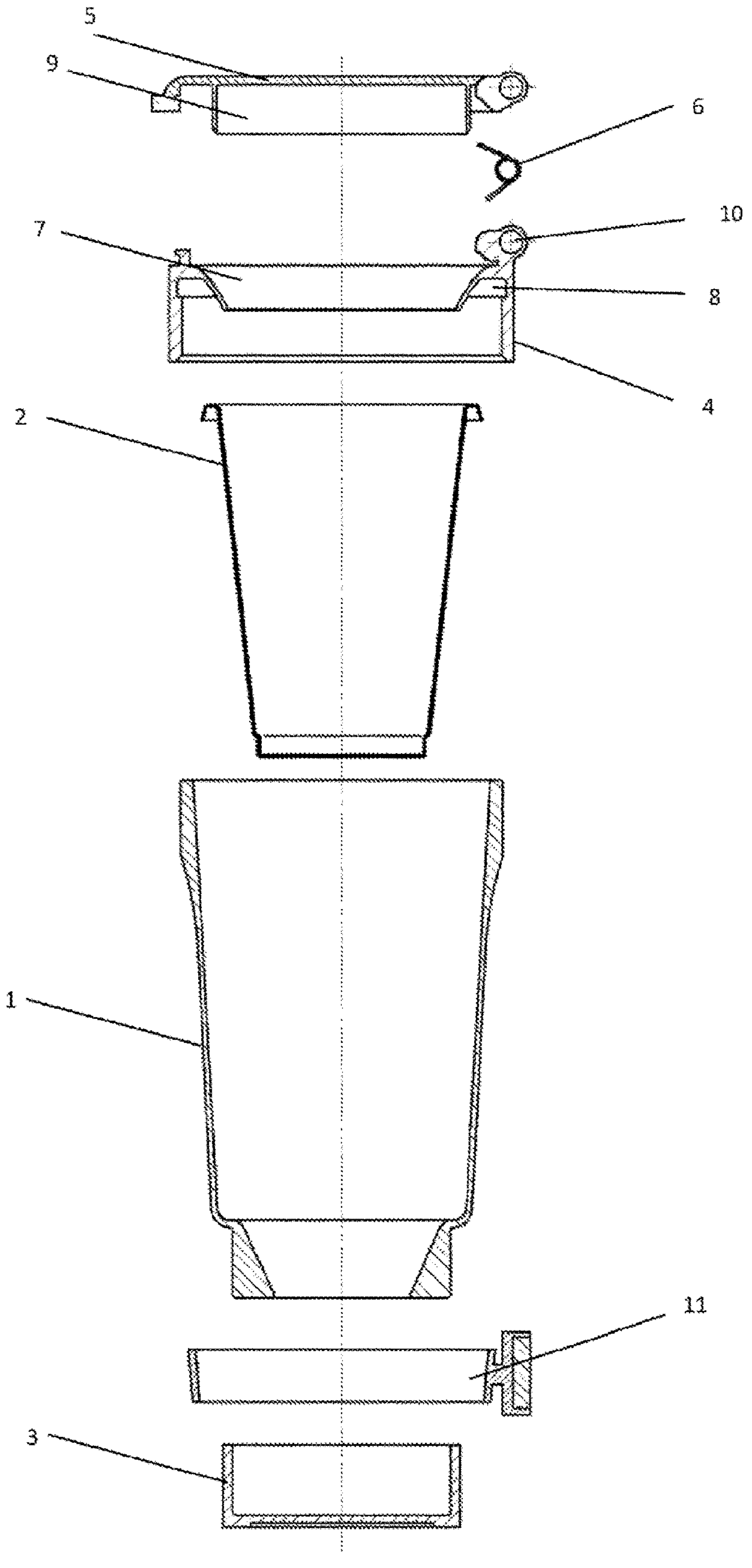
FIG. 2 shows an illustrative exploded view of the claimed container, with all parts labelled, for a disposable cup of medium size.
Figure 3:
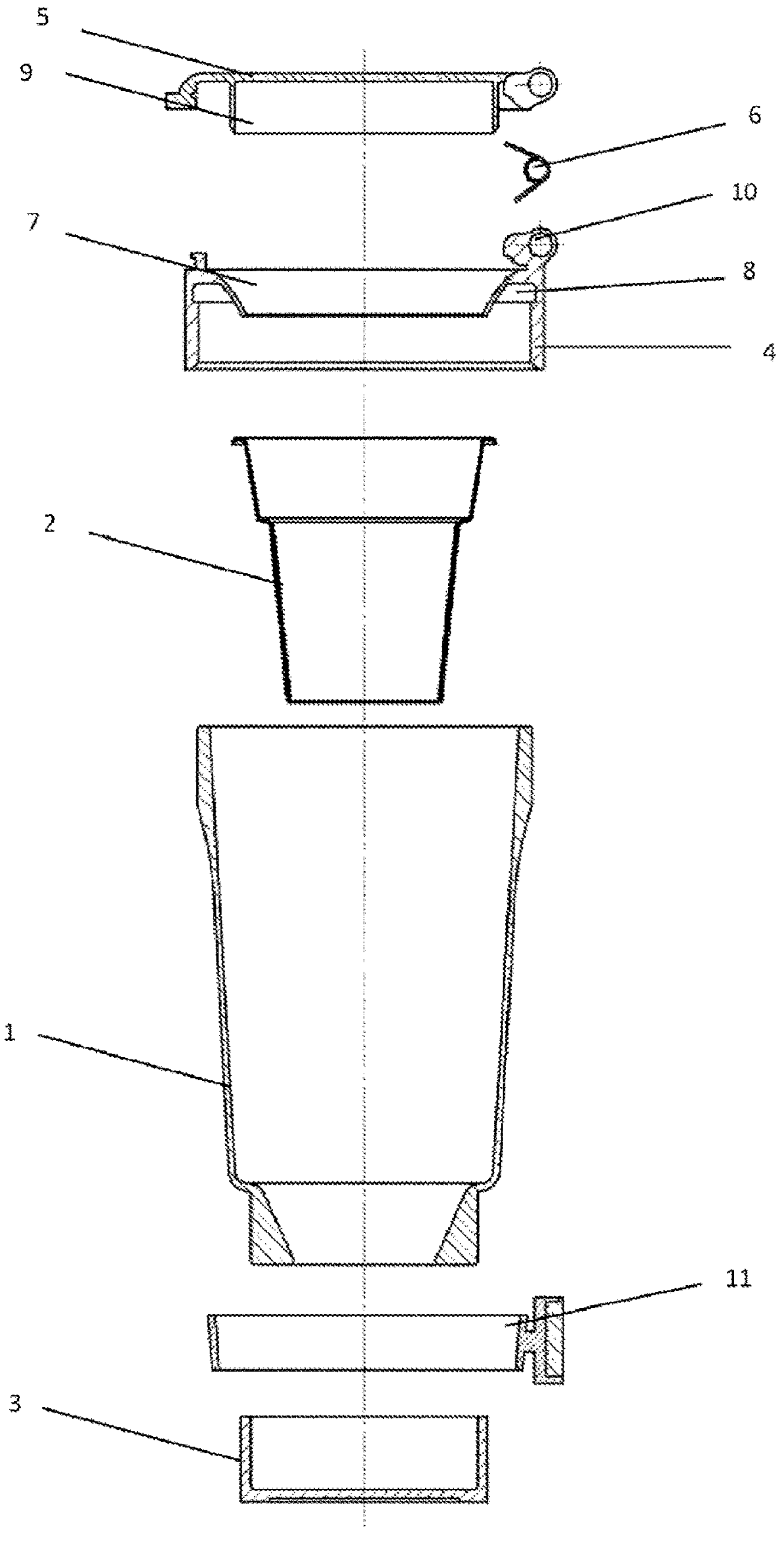
FIG. 3 shows an illustrative exploded view of the claimed container, with all parts labelled, for a disposable cup of small size.
Figure 4:
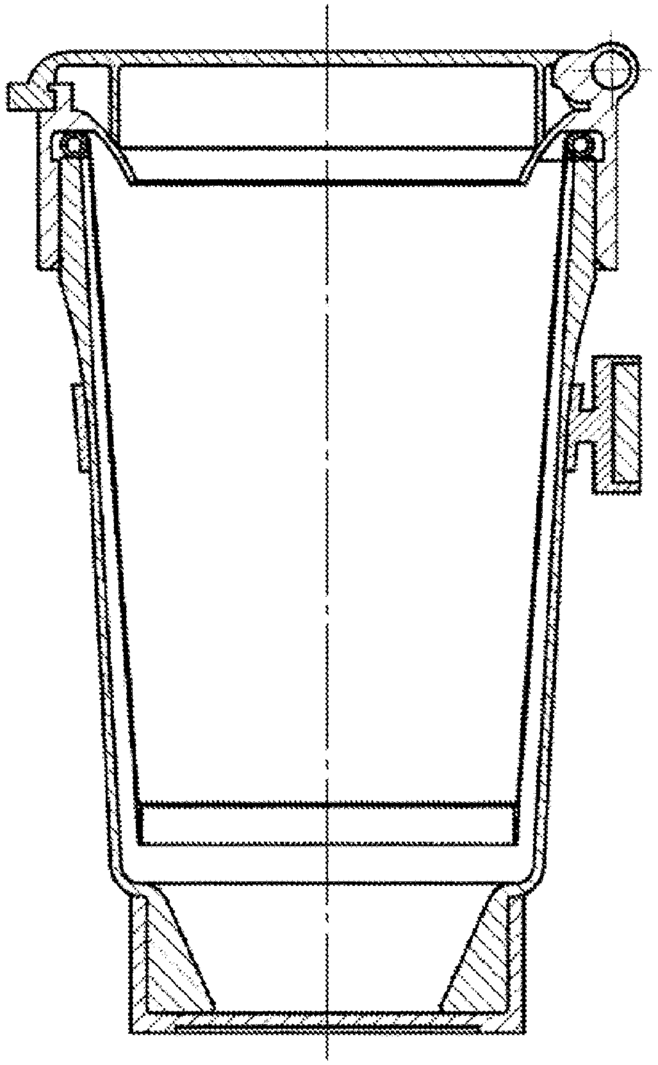
FIG. 4 shows an illustrative assembled view of the claimed container for a disposable cup of large size.
Figure 5:
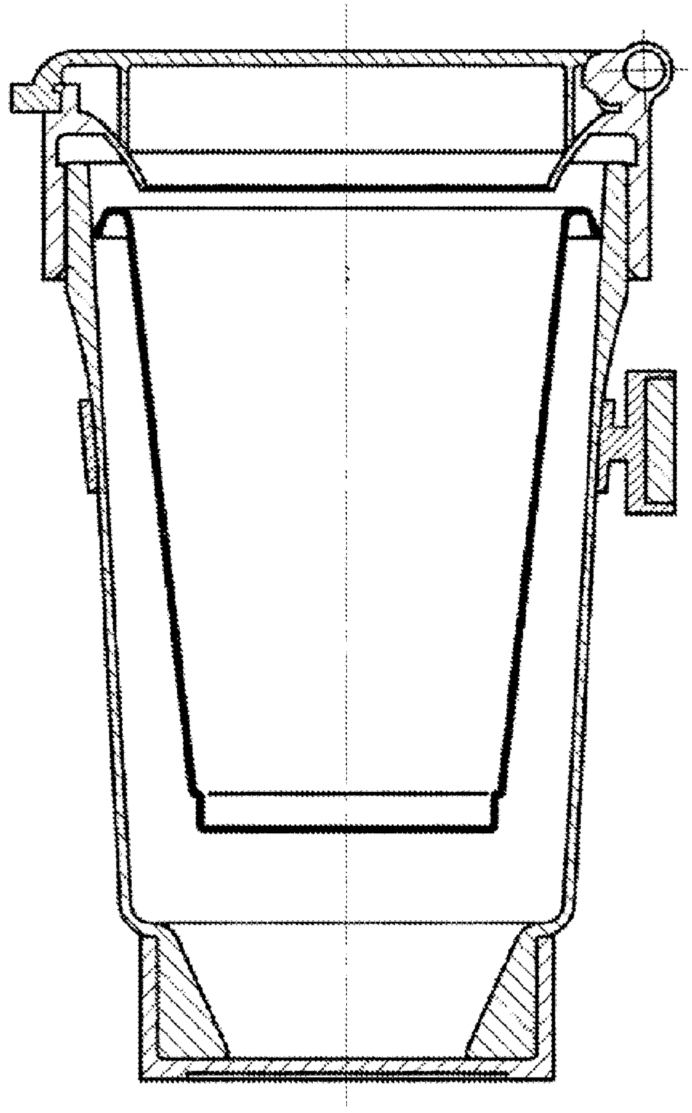
FIG. 5 shows an illustrative assembled view of the claimed container for a disposable cup of medium size.
Figure 6:
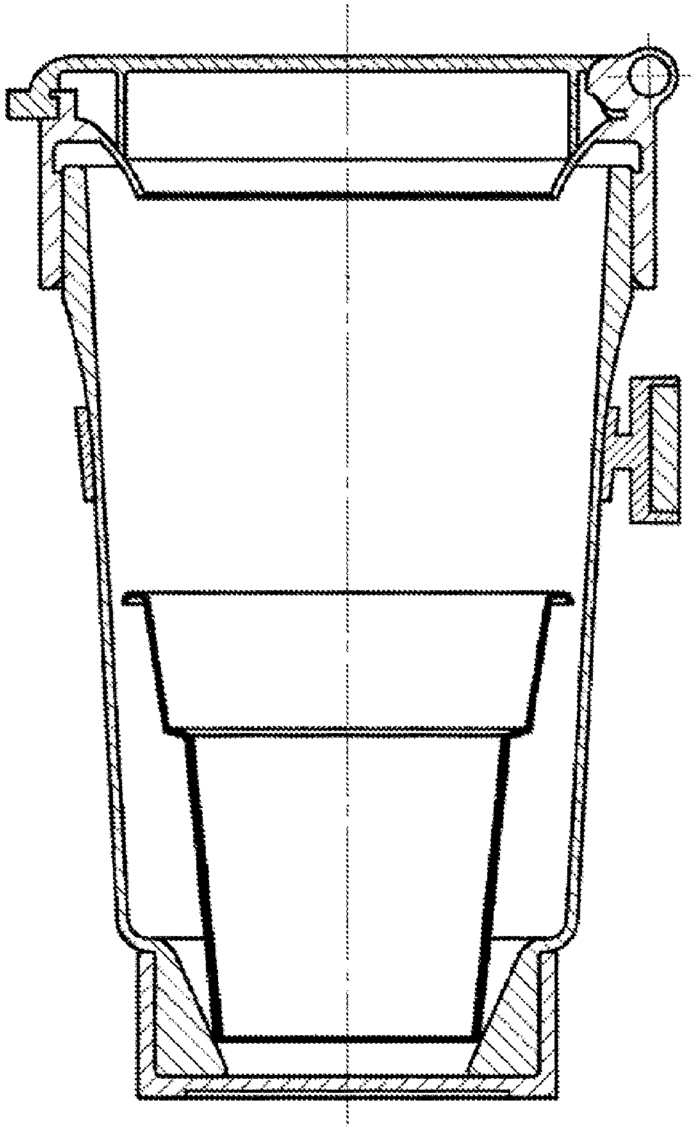
FIG. 6 shows an illustrative assembled view of the claimed container for a disposable cup of small size.
Figure 7:
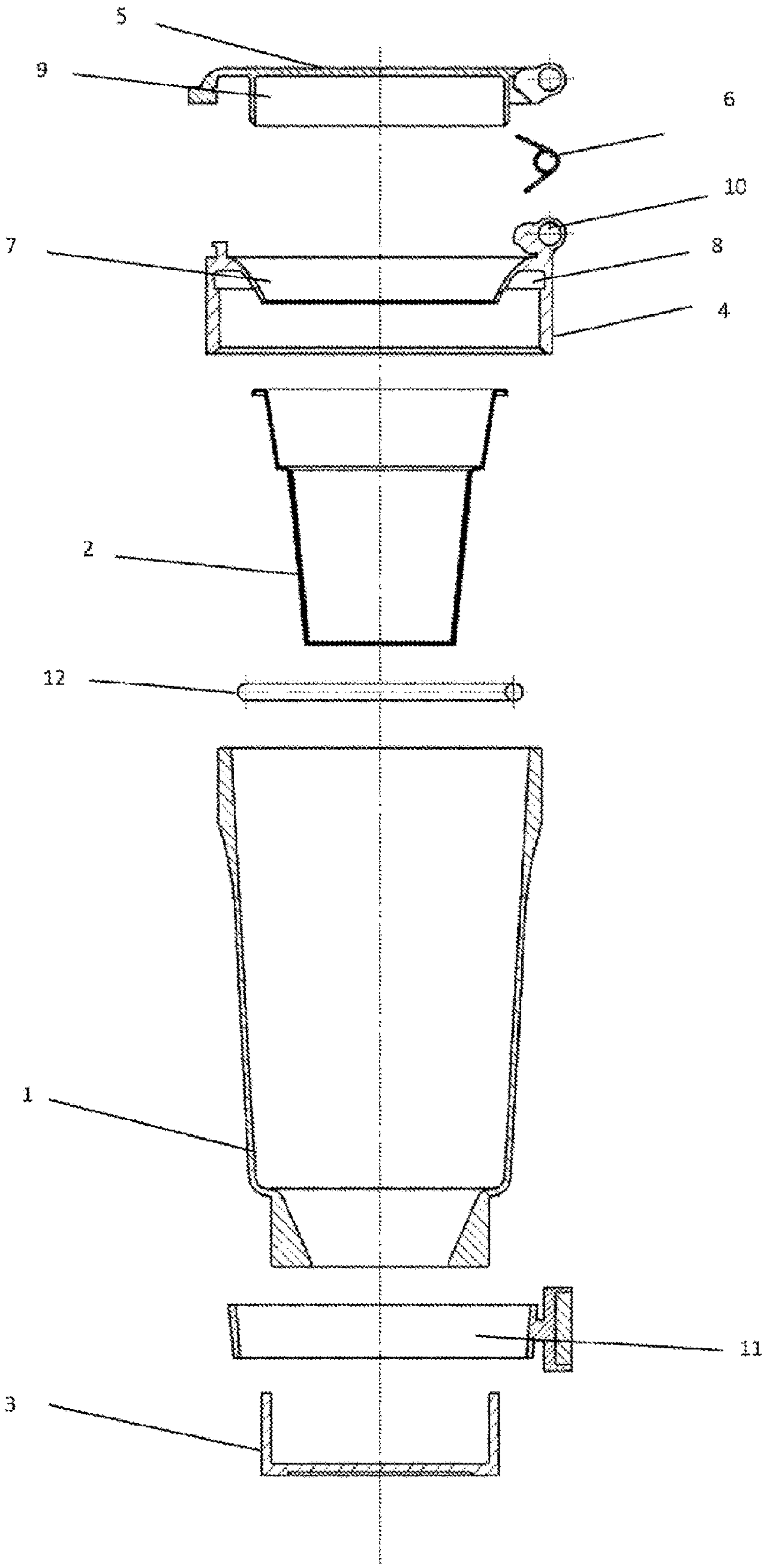
FIG. 7 shows an illustrative exploded view of the claimed container, with all parts labelled, including an additionally provided expanding elastic rim inside the container housing.
Figure 8:
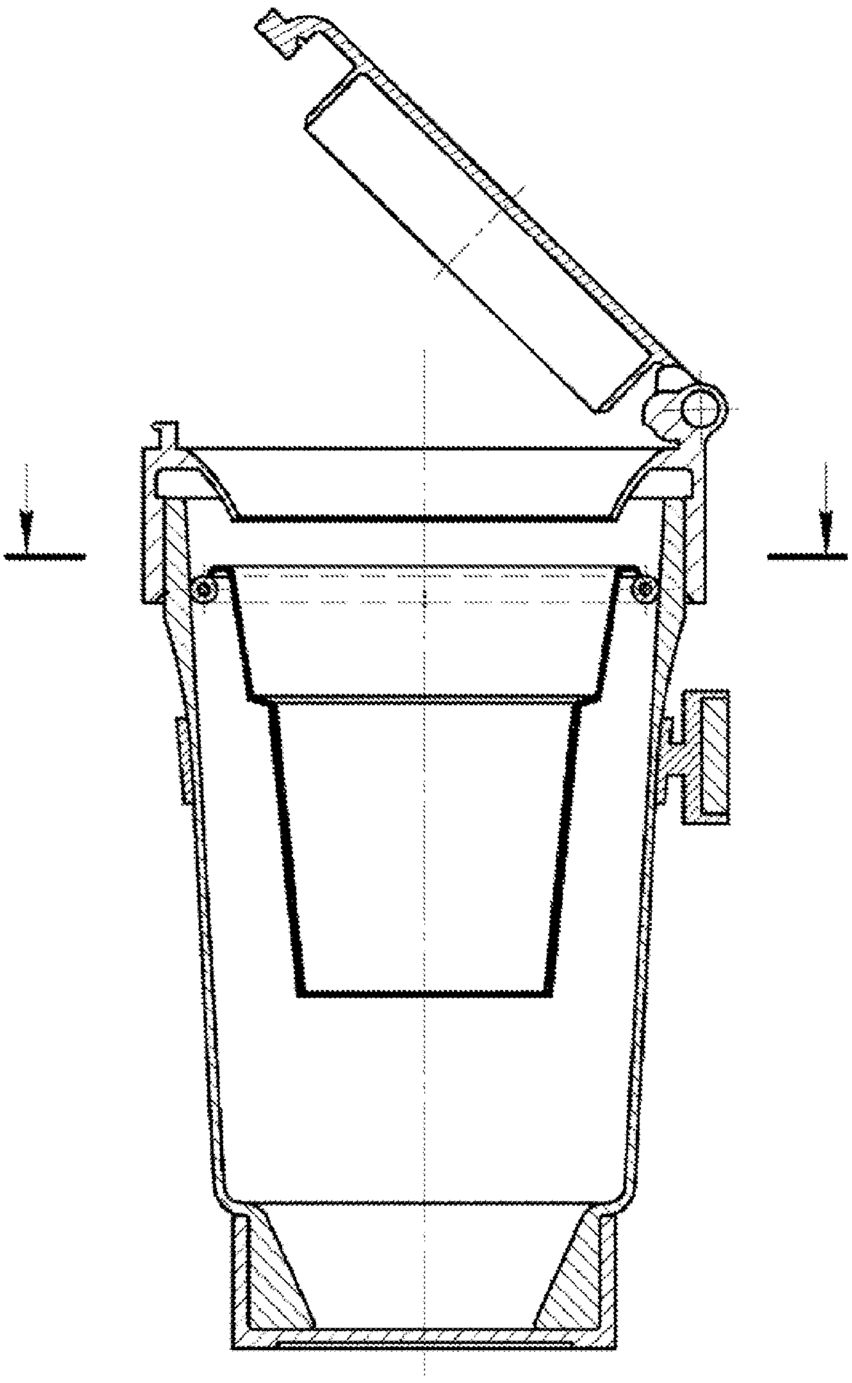
FIG. 8 shows an illustrative assembled view of the claimed container, with the lid being opened, including an additionally provided expanding elastic rim inside the container housing, which fixes a disposable cup of small size at the upper part of the container housing, maximally approximating the disposable cup to the funnel opening.
Figure 9:
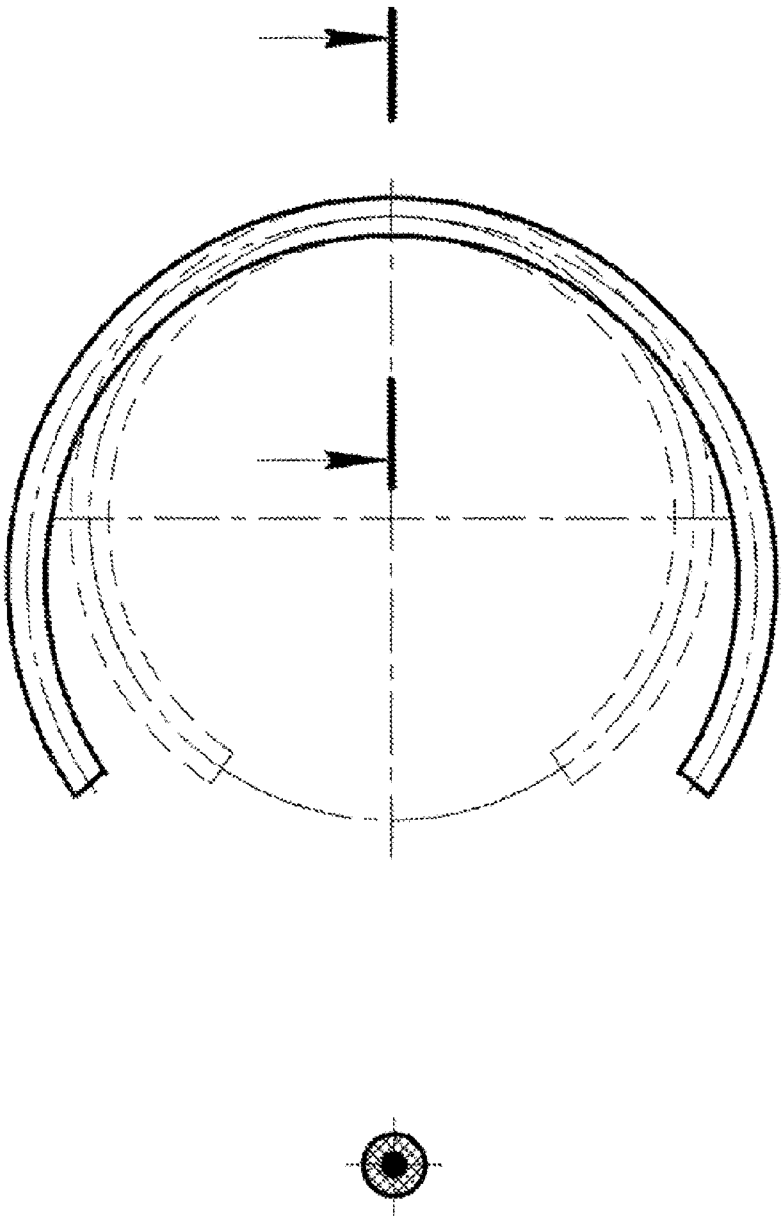
FIG. 9 shows an illustrative view of the expanding elastic rim.
Figure 10:
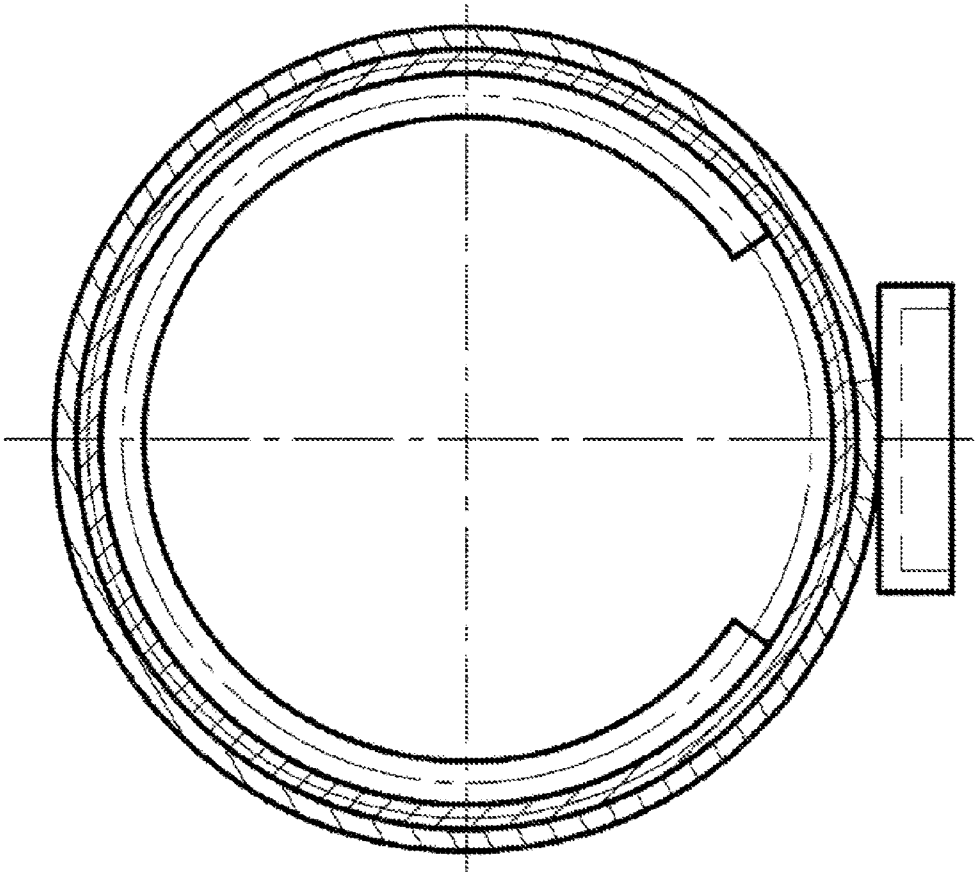
FIG. 10 shows an illustrative top view of the expanding elastic rim inside the housing of the claimed container.

The inventive portable container for a disposable cup for collecting saliva, spits and items of waste is implemented as follows.

Before use, a user removes the upper lid of the container, inserts a disposable vessel in the form of a cup inside the container housing and closes the upper lid. After using the article for its intended purpose, that is, after the disposable cup is filled, the user replaces the disposable cup. For this purpose, the user removes the upper lid and the lower lid of the container, then pushes the disposable cup upwards through the lower hole in the housing with a finger, and removes the filled cup with the other hand. Afterwards, he inserts a clean disposable cup inside the container, closes the lower and upper lids. The container is ready for use as intended. The container as claimed is suitable for several types of size of disposable cups. For example, a disposable cup of larger size, but not larger than the diameter of the upper part of the container housing, will fit tightly over the entire inside part against the inner walls of the container housing. A disposable cup of medium size will fit tightly with its upper part against the part of the container housing where the internal diameter of the container housing wall will be narrowed due to the conical shape and will not allow the cup to go further down. A disposable cup of small size, whose upper part diameter is so small that it is unable to be tightly fixed inside the container housing, will go to the bottom of the container and will fit tightly with its lower part in the recess having a conical shape provided in the bottom of the container.

The claimed portable container for a disposable cup for collecting saliva, spits and items of waste may be additionally provided with an elastic rim that can be used at the user's request for fixing disposable cups of small size in the upper part of the container housing. The rim, thanks to its expanding ability, is tightly fixed inside the container housing at the required height. Thus, in this place, the diameter of the inside part of the container housing is reduced by the thickness of the rim diameter, thereby fixing the disposable cup of small diameter in the upper part of the container housing, where it will be as close as possible to the funnel opening. This ensures that the liquid flowing down the funnel opening goes precisely into the cup. The expanding rim may be an arc-shaped elastic thin rod made of metal or other material, on which a shell made of soft material (rubber, plastic, etc.) of the required diameter thickness can be sleeved from the outside or be an elastic thick rod or an elastic spring rolled up into an arc.

The invention claimed is:

1. A portable container for a disposable cup for collecting saliva, spits and small items of waste, comprising a rigid housing that is inserted with a disposable vessel in the form of a cup, an upper lid and a lower lid, characterized in that the upper lid has a flip lid with a seal, the upper lid has a funnel opening, and the inside part of the rigid housing has a conical shape along the entire length, wherein the diameter of the lower inside part of the rigid housing is smaller than the diameter of the upper inside part of the rigid housing so as to allow for inserting disposable cups of different diameters into the rigid housing, wherein the bottom of the lower part of the rigid housing comprises a recess having a conical shape, and a hole that is smaller than the diameter of the bottom of the disposable cup, and the lower lid tightly closes the hole in the bottom of the rigid housing.

2. The portable container for a disposable cup for collecting saliva, spits and small items of waste as claimed in claim 1, wherein the upper lid has a liner.

3. The portable container for a disposable cup for collecting saliva, spits and small items of waste as claimed in claim 1, wherein the inside part of the rigid housing has an expanding elastic rim.

4. The portable container for a disposable cup for collecting saliva, spits and small items of waste as claimed in claim 1, wherein the container has a holder with a magnet and a hole for a strap.

* * * * *